US012671924B2

(12) United States Patent
Veselaski, Jr. et al.

(10) Patent No.: US 12,671,924 B2
(45) Date of Patent: Jun. 30, 2026

(54) AUDIO SYSTEM WITH DETACHABLE GRILL

(71) Applicant: Garmin International, Inc., Olathe, KS (US)

(72) Inventors: Stephen V. Veselaski, Jr., Miramar, FL (US); Dwayne H. Spanbroek, Miramar, FL (US)

(73) Assignee: Garmin International, Inc., Olathe, KS (US)

( * ) Notice: Subject to any disclaimer, the term of this patent is extended or adjusted under 35 U.S.C. 154(b) by 141 days.

(21) Appl. No.: 18/624,844

(22) Filed: Apr. 2, 2024

(65) Prior Publication Data

US 2025/0310671 A1 Oct. 2, 2025

(51) Int. Cl.
*H04R 1/02* (2006.01)
*H04R 1/24* (2006.01)

(52) U.S. Cl.
CPC ............. *H04R 1/023* (2013.01); *H04R 1/025* (2013.01); *H04R 1/24* (2013.01); *H04R 2400/11* (2013.01)

(58) Field of Classification Search
CPC .......... H04R 1/023; H04R 1/025; H04R 1/24; H04R 2400/11
USPC ......................................... 381/186, 150, 182
See application file for complete search history.

(56) References Cited

U.S. PATENT DOCUMENTS

| | | | | | |
|---|---|---|---|---|---|
| 4,239,943 | A * | 12/1980 | Czerwinski | H04R 7/16 | 381/403 |
| 4,687,173 | A * | 8/1987 | Genna | G11B 33/08 | 248/603 |
| 10,484,767 | B1 | 11/2019 | Proni et al. | | |
| 11,785,366 | B2 | 10/2023 | Proni et al. | | |
| 2006/0177088 | A1 * | 8/2006 | Howard | H04R 1/025 | 381/391 |
| 2008/0044053 | A1 | 2/2008 | Belanger et al. | | |
| 2012/0076337 | A1 * | 3/2012 | Wegener | H04R 1/02 | 381/334 |
| 2012/0321121 | A1 | 12/2012 | Taylor et al. | | |
| 2014/0233786 | A1 | 8/2014 | Sumitani et al. | | |
| 2023/0199402 | A1 * | 6/2023 | Yu | H04R 7/02 | 381/398 |

* cited by examiner

*Primary Examiner* — Thjuan K Addy
(74) *Attorney, Agent, or Firm* — Samuel M. Korte; Max M. Ali; Kathleen D. Fitterling

(57) ABSTRACT

An audio system can include a speaker frame, a first loudspeaker mounted within the frame, a perforated mounting ring suspended from the frame, a second loudspeaker, a plurality of magnets, and a grill including a magnetic portion. The perforated mounting ring includes a central aperture in which the second loudspeaker is mounted. The magnets are disposed on the mounting ring to allow the grill to removably attach to the speaker frame through magnetic coupling with mounting ring.

10 Claims, 4 Drawing Sheets

AUDIO SYSTEM WITH DETACHABLE GRILL

BACKGROUND

Audio devices, such as loudspeakers, generally include a grill to protect the speaker components from damage. A grill is typically mounted to or formed as a part an enclosure or baffle. Grills may include a screen formed of "soft" material such as fabric, or "hard" material" such as metal, plastic, or wood, and may be attached directly to a frame of the speaker, to an enclosure that houses the speaker, or to a baffle that mounts the speaker.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

Figure 1:
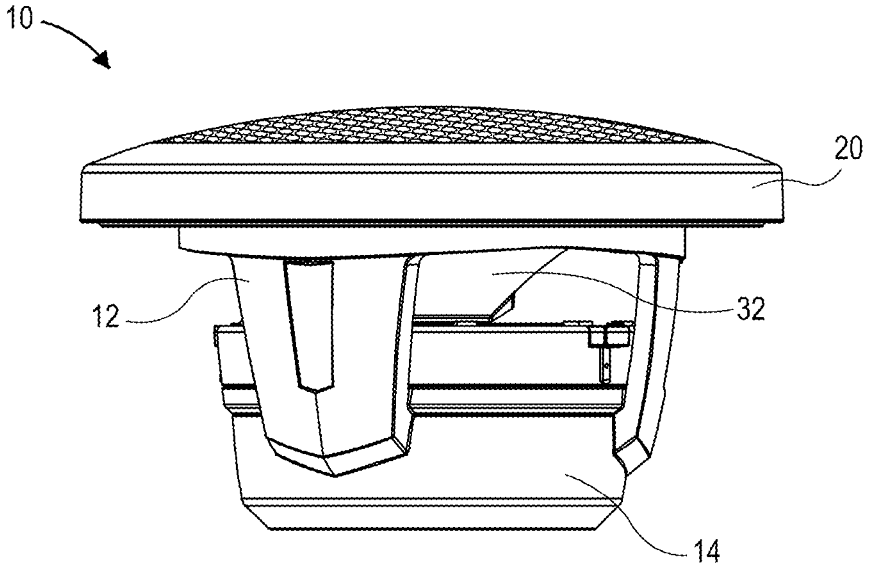
FIG. 1 is a side view of an example audio system.

An audio system 10 may be configured for mounting on a ceiling, wall, roof, or other type of fixed or permanent structure, or configured to be a standalone speaker on a substantially flat or planar surface. Embodiments of the present invention may include loudspeaker configurations and functionality like that disclosed in U.S. Pat. Nos. 10,484,767 and 11,785,366, each of which is incorporated herein by specific reference in its entirety.

In one example, the audio system 10 is configured for use in marine environments and/or home environments. As illustrated in FIGS. 1-6, the audio system 10 may include a speaker frame 12, a first loudspeaker 14 mounted within the frame 12, a perforated mounting ring 16, a second loudspeaker 18 mounted within the perforated mounting ring 16, and a removable grill 20 operable to removably attach to the speaker frame 12 through magnetic coupling with the mounting ring 16. The perforated mounting ring 16 enables the second loudspeaker 18 to be held by the speaker frame 12 without impeding the attachment and detachment of the removable grill 20.

Figure 2:
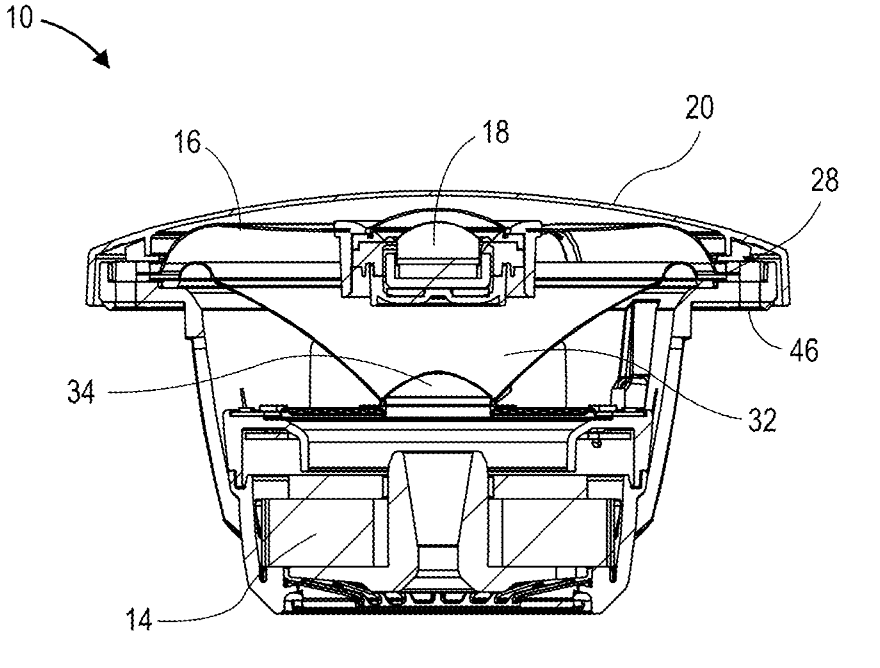
FIG. 2 is a cross-sectional view of the audio system of FIG. 1.
Figure 3:
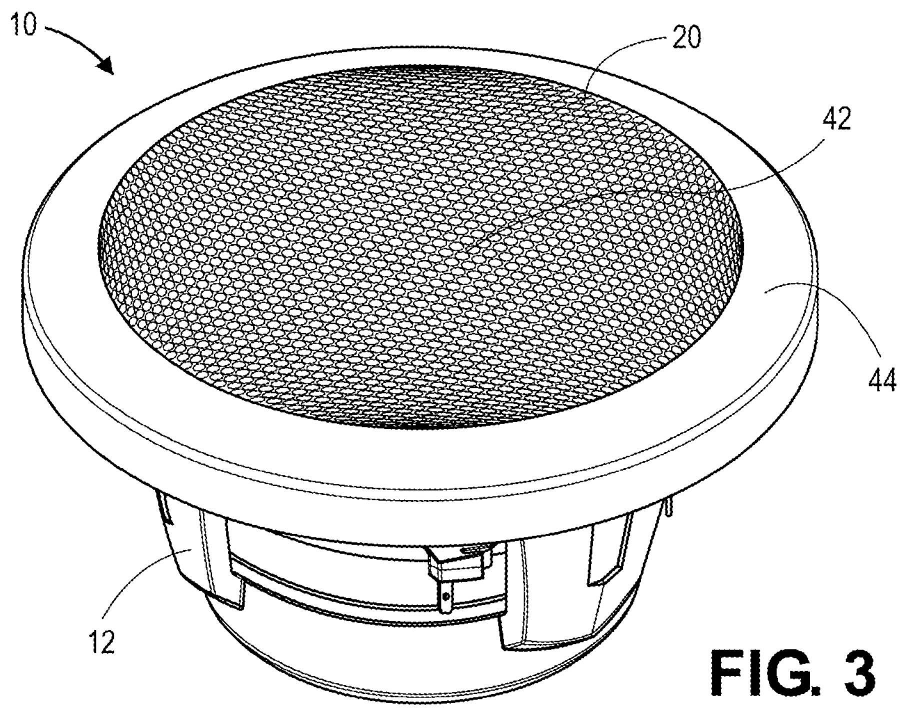
FIG. 3 is a perspective view of the audio system of FIG. 1.
Figure 4:
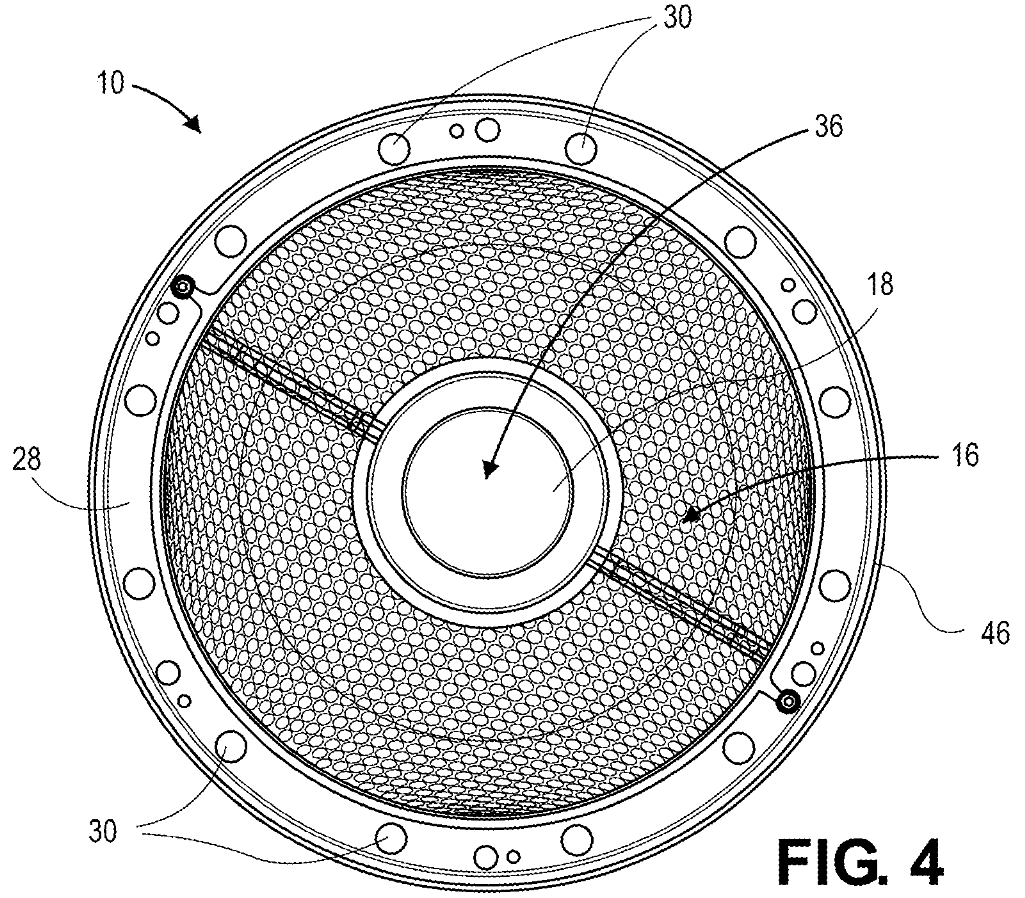
FIG. 4 of a top view of the audio system of FIG. 1, showing an exposed perforated mounting ring.
Figure 5:
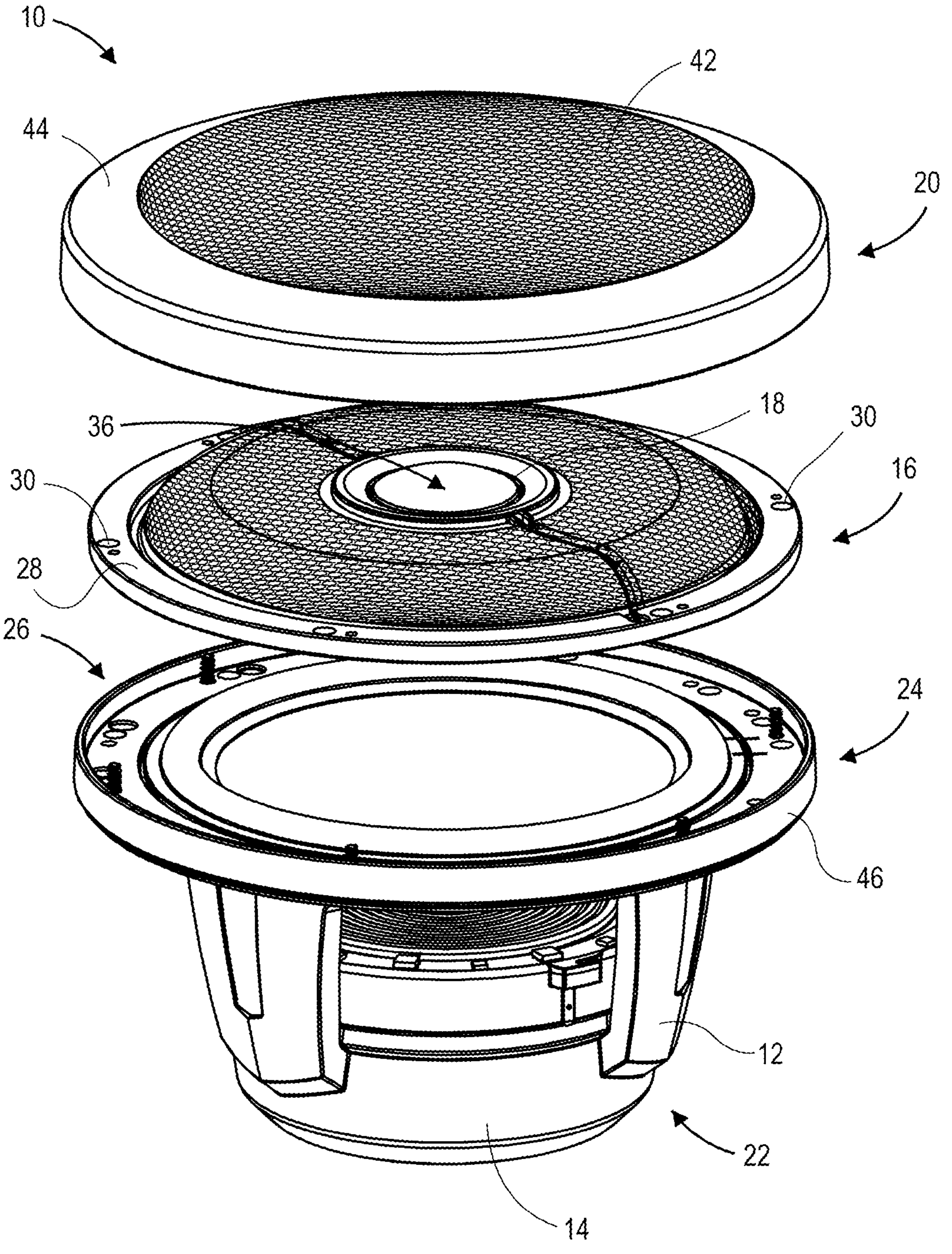
FIG. 5 is an exploded view of the audio system of FIG. 1.

The frame 12 may be formed of molded plastic, wood, metal, or any other suitable material for retaining the elements of the system 10. The frame 12 may include a first end 22 and an opposite second end 24 forming an annular cavity 26. The second end 24 may include a rim 46 for retaining the mounting ring 16 as shown in FIGS. 2, 4, and 5.

The first loudspeaker 14 may be a woofer, mid-range or other loudspeaker depending on the requirements of a particular application. It may be mounted to the frame 12 using fasteners and/or adhesives. As seen in FIGS. 1 and 2, the first loudspeaker 14 may include a diaphragm 32 and dust cap 34.

Each of these components of the first loudspeaker 14 may be formed of a material that is resistant to moisture, debris and other contaminants that may be present in an outdoor environment. The first loudspeaker 14 may be mounted within the frame 12 at, or otherwise in proximity to, the first end 22 of the frame 12.

The perforated mounting ring 16 is suspended within the frame 12. In various examples, the mounting ring 16 is suspended within the annular cavity 26 of the frame 12. The mounting ring 16 may include the same dimensions as the section of the annular cavity 26 in which it is suspended so that the mounting ring 16 substantially fills the annular cavity 26. For instance, the mounting ring 16 may be donut or ring shaped so that its circumference matches the internal circumference of the annular cavity 26. The perforations of the mounting ring 16 may substantially fill the area of the mounting ring 16 between the second loudspeaker 18 and the frame 12 to eliminate any large gaps or voids between the second loudspeaker and the rim 46 of frame 12. The outer circumference of the mounting ring 16 may substantially match the circumference of the rim 46 of the frame 12 to maximize the attachment area between frame 12 and ring 16.

The mounting ring 16 is perforated so that sound generated by the first loudspeaker may pass through without degrading audio quality. Like the frame 12, the mounting ring 16 may be made of any suitable material for use within system 10, including plastic, wood, and metal. In some examples, the mounting ring 16 may include decorative elements or colors as it can be viewed through grill 20. The perforated portion of mounting ring 16 may be formed of plastic, metal, cloth, fabric, natural materials like wood, and combinations thereof. In some configurations, a perforated metal sheet is used as the mounting ring 16. In the illustrated examples, mounting ring 16 includes a central aperture 36 in which the second loudspeaker 18 may be mounted or otherwise attached.

The mounting ring 16 may include an annular flange 28 upon which a plurality of frame magnets 30 are disposed, such as through potting, gluing, or other attachment. The system 10 may include any number of frame magnets 30 arranged in any configuration or amount on the frame 12 and/or mounting ring 16 to enable attachment to the removeable grill 20. The illustrated examples show the frame magnets 30 spaced around the annular flange 28 with equal spacing. However, any configuration may be employed. The frame magnets 30 may be directly placed on the annular flange 28 of the mounting ring 16 and/or be placed on the frame 12 itself, with the mounting ring 16 including apertures to allow magnetic coupling between the magnets 30 and removable grill 20. In some configurations, the mounting ring 16 may be fully integrated with the frame 12, such as where the frame 12 and mounting ring 16 are formed of a single material or otherwise integrated together.

The second loudspeaker 18 may be a tweeter capable of reproducing sound in higher range frequencies compared to the first loudspeaker 14. Alternatively, one or more other speakers, such as both a tweeter and a mid-range speaker, may also be secured to the perforated mounting ring 16. The second loudspeaker 18 may be secured to the perforated mounting ring 16 using adhesives and/or other fasteners.

In some embodiments, the mounting ring 16 may lack the second loudspeaker 18 so that the system 10 includes only the first loudspeaker 14. For instance, in a subwoofer configuration, a tweeter or other second loudspeaker 18 may be omitted from the system 10, with the mounting ring 16 still enabling magnetic coupling of the grill 20 to the frame 12. Such functionality enables the easy attachment and detachment of the removable grill 20.

Figure 6:
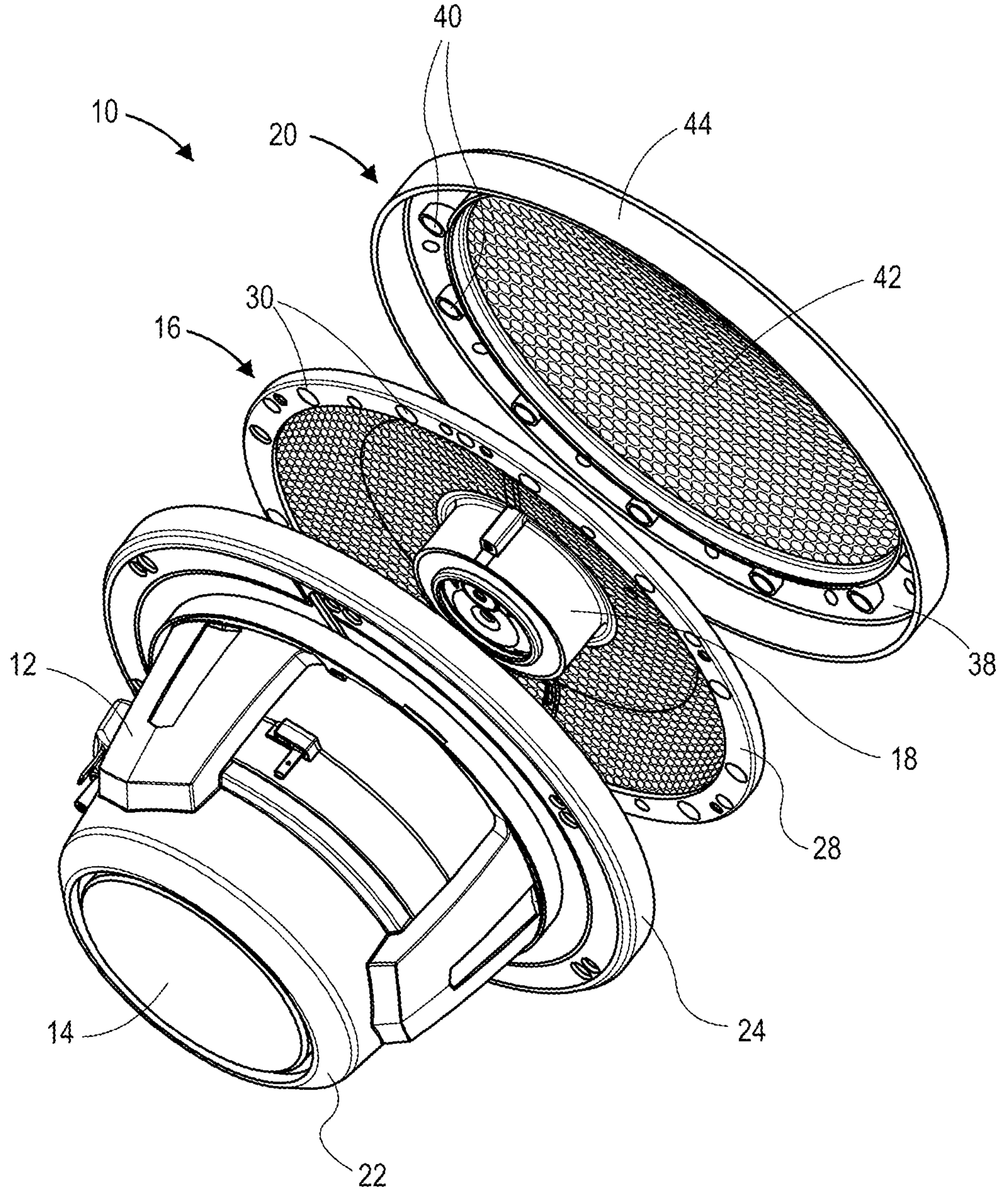
FIG. 6 is an exploded view of the audio system of FIG. 1 from the opposite perspective of FIG. 5.

As shown in FIGS. 5-6, the removable grill 20 includes a magnetic portion 38 operable to removably attach to mounting ring 16, such as its frame magnets 30, through magnetic coupling. The grill 20 may include a plurality of grill magnets 40 arranged on the grill 20 for reciprocal attachment to the frame magnets 30. In some examples, the grill 20 includes a perforated inset portion 42 and an outer ring 44. The outer ring 44 may include a portion sized and configured to match the dimensions of the frame 12 and/or mounting ring 16, such as its annular flange 28, to allow the grill 20 to seamlessly attach to the frame 12 to create a uniform appearance for system 10. The grill magnets 40 may be positioned on outer ring 44 through potting, gluing, or other attachment methods. The outer ring 44 itself may also be formed of a magnetic material eliminating the need for discrete grill magnets 40. The inset portion 42 is perforated to allow sound generated by the loudspeakers 14, 18 to pass for reception by listeners. The insert portion 42 may be formed of any suitable material, including plastic, metal, cloth, fabric, natural materials like wood, and combinations thereof, and may include decorative elements or colors. In one example, the insert portion 42 is stainless steel sheet metal, stamped into a cosmetic pattern, and adhered to the outer ring 44 using adhesives, fasteners, or the like In some examples, inset portion 42 may be omitted so that mounting ring 16 is clearly visible to users.

As shown in FIGS. 2 and 5, rim 46 of frame 12 may present a surface area for coupling with flange 28 of mounting ring 16 while also supporting diaphragm 32. Flange 28 and diaphragm 32 may be attached to rim 46 using adhesives and/or other suitable fasteners. Rim 46 may be substantially flat and extend perpendicular from annular cavity 26 to provide a suitable attachment location for elements of the system 10. In the example of FIG. 2, diaphragm 32 is attached directly to rim 46 and mounting ring 16 is attached on top of the edges of diaphragm 32 on rim 46.

Grill 20 can substantially cover mounting ring 16 when mounted thereto while fully covering second end 24 of frame 12 to conceal the edges of frame 12, including rim 46. In some embodiments, grill 20, such as its outer ring 44, may overlap and extend past rim 46 to conceal edges of frame 12 from view when installed.

Because of the configuration of the perforated mounting ring 16, the grill 20 may attach to the frame 12 and mounting ring 16 without being burdened by mounting of the second loudspeaker 18. This enables a variety of grill shapes and styles to be magnetically attached to the frame 12, to form system 10, to achieve any desired cosmetic look or external appearance. For instance, although a circular grill 20 is illustrated in the figures, the flexibility of the mounting configuration provided by system 10 allows grills of any size or shape to be used by the same frame 12. So, for instance, an installer need only select an appropriate grill to match the environment of the system 10 (home, marine, etc.,) while using the same frame 12, first loudspeaker 14, mounting ring 16, and second loudspeaker 18. Such functionality reduces the cost and installation burden of using the system 10 while providing flexibility in installation location and design.

In some examples, the system 10 includes a plurality of detachable grills 20 that may be selected by the user and/or installer to achieve a desired aesthetic configuration. One grill, like the illustrated grill 20, may present a circular appearance. A second grill may present a rectangular appearance. The second grill, with its rectangular appearance, may include an inside ring structure, configured like the outer ring 44 of the first grill 20, but not visible by the user, on which the grill magnets 40 may be disposed for mounting to frame 12 and mounting ring 16. Use of the inner (hidden) ring for attachment to frame 12 allows grills of any circular or non-circular shape or size to be attached to frame 12 without disrupting the aesthetics of system 10. And, similarly, many grills of the same physical configuration may be employed with each grill having a distinctive physical appearance.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An audio system comprising:

a speaker frame;

a first loudspeaker mounted within the frame;

a perforated mounting ring suspended from the frame and positioned in an acoustic path of the first loudspeaker such that sound generated by the first loudspeaker passes through perforations of the mounting ring, the perforated mounting ring including a central aperture;

a second loudspeaker mounted to the perforated mounting ring within the central aperture of the mounting ring;

a plurality of magnets disposed on the mounting ring; and a first grill including a magnetic portion operable to removably attach to the speaker frame through magnetic coupling with the mounting ring.

2. The system of claim 1, wherein the second loudspeaker includes a tweeter.

3. The system of claim 1, wherein the speaker frame forms an annular cavity with the first loudspeaker positioned at a first end of the cavity and the mounting ring positioned on a second end of the cavity.

4. The system of claim 3, wherein the perforated mounting ring is suspended within the cavity.

5. The system of claim 3, wherein the mounting ring includes an annular flange and the magnets are positioned on the flange.

6. The system of claim 1, further including a diaphragm extending from the first loudspeaker towards the perforated mounting ring.

7. The system of claim 1, further including a second grill having different dimensions than the first grill, the second grill operable to removably attach to the speaker frame through magnetic coupling with the mounting ring when the first grill is detached from the speaker frame.

8. The system of claim 7, wherein the first grill has a circular shape and the second grill has a non-circular shape.

9. The system of claim 1, wherein the first grill includes a perforated insert portion and an outer ring, wherein the magnetic portion of the first grill is provided by magnets disposed within the outer ring.

10. An audio system comprising:

a speaker frame;

a first loudspeaker mounted within the frame;

a perforated mounting ring suspended from the frame and positioned in an acoustic path of the first loudspeaker such that sound generated by the first loudspeaker passes through perforations of the mounting ring, the perforated mounting ring including a central aperture and an annular flange, a second loudspeaker mounted to the perforated mounting ring within the central aperture of the mounting ring, the second loudspeaker including a tweeter;

a plurality of magnets disposed on the mounting ring within the annular flange; and a first grill including a magnetic portion operable to removably attach to the speaker frame through magnetic coupling with the mounting ring; and a second grill including a magnetic portion operable to removably attach to the speaker frame through magnetic coupling with the mounting ring when the first grill is not attached to the speaker frame, wherein the first grill has a circular shape and the second grill has a non-circular shape.

* * * * *